United States Patent [19]

Edgley et al.

[11] Patent Number: 4,780,243

[45] Date of Patent: Oct. 25, 1988

[54] DRY SAND FOAM GENERATOR

[75] Inventors: Kevin D. Edgley; James L. Stromberg, both of Duncan, Okla.

[73] Assignee: Halliburton Company, Duncan, Okla.

[21] Appl. No.: 864,696

[22] Filed: May 19, 1986

[51] Int. Cl.[4] ........................ E21B 43/267; B01J 8/00

[52] U.S. Cl. .................................... 252/307; 166/280; 252/8.551; 261/DIG. 26; 175/69

[58] Field of Search ..................... 252/305, 307, 8.551; 166/280; 175/69; 261/DIG. 26

[56] References Cited

U.S. PATENT DOCUMENTS

| | | | |
|---|---|---|---|
| 2,051,841 | 8/1936 | Gilbert | 261/28 |
| 2,418,858 | 4/1947 | Urquhart | 169/15 |
| 2,585,092 | 2/1952 | Conto | 261/76 |
| 2,715,045 | 8/1955 | Thompson | 299/86 |
| 3,090,444 | 5/1963 | Bandiroli | 169/15 |
| 3,266,193 | 8/1966 | McCune | 51/12 |
| 3,279,862 | 10/1966 | Hubbard | 302/23 |
| 3,291,536 | 12/1966 | Smoot | 302/49 |
| 3,395,945 | 8/1968 | Kopineck et al. | 302/66 |
| 3,603,398 | 9/1971 | Hutchison et al. | 166/305 |
| 3,937,283 | 2/1976 | Blauer et al. | 166/307 |
| 3,980,136 | 9/1976 | Plummer et al. | 166/280 |
| 4,027,993 | 6/1977 | Wolff | 415/1 |
| 4,038,037 | 7/1977 | Wilmsen | 23/288 R |
| 4,126,181 | 11/1978 | Black | 166/280 |
| 4,156,464 | 5/1979 | Hussin | 166/308 |
| 4,323,474 | 4/1982 | Hansen et al. | 252/307 |
| 4,330,086 | 5/1982 | Nysted | 239/8 |
| 4,354,552 | 10/1982 | Zingg | 166/90 |
| 4,361,187 | 11/1982 | Luers | 166/326 |
| 4,396,529 | 8/1983 | Price et al. | 252/307 |
| 4,438,815 | 3/1984 | Elson et al. | 166/278 |
| 4,448,709 | 5/1984 | Bullen | 252/359 D |
| 4,453,596 | 6/1984 | Conway et al. | 166/278 |
| 4,474,680 | 10/1984 | Kroll | 252/307 |
| 4,480,696 | 11/1984 | Almond et al. | 166/308 |
| 4,569,394 | 2/0986 | Sweatman et al. | 166/280 |
| 4,583,002 | 4/1986 | Cox et al. | 55/257 PP |

FOREIGN PATENT DOCUMENTS

| | | |
|---|---|---|
| 43871 | 1/1974 | Austria . |
| 1093519 | 1/1981 | Canada . |
| 88029 | 9/1983 | European Pat. Off. . |
| 2353144 | 1/1978 | France . |
| 2076672 | of 0000 | United Kingdom . |
| 2076681 | of 0000 | United Kingdom . |
| 2118451 | 11/1983 | United Kingdom . |

OTHER PUBLICATIONS

The Invention Disclosed in U.S. Patent Application Serial No. 561,015 to Reidenbach, entitled Foam Generator and Method of Foam Generation filed 12-13-83, abandoned 10-5-85.

Nowasco Information Bulletin dated Sep. 1978, entitled Nowsco Develops "Sand Intensifier", Process.

SPE Paper 11013 Entitled, "Foam Gravel Packing", by T. D. Elson et al., 1982.

*Primary Examiner*—John F. Terapane
*Assistant Examiner*—Virginia B. Caress
*Attorney, Agent, or Firm*—James R. Duzan; Lucian Wayne Beavers

[57] ABSTRACT

Apparatus and methods are provided for producing a proppant carrying foamed fracturing fluid or the like having very high ratios of proppant material to the liquid phase of the foam, which can be substantially higher than even the theoretical maximum ratio available when the proppant is introduced into a foaming apparatus as a proppant/liquid slurry. This is accomplished by a dry sand foam generation process wherein the sand or other particulate material is introduced into a foam generator apparatus as a dry particulate material in a stream of gas which is subsequently mixed with a second liquid stream.

12 Claims, 3 Drawing Sheets

DRY SAND FOAM GENERATOR

BACKGROUND OF THE INVENTION

1. Field of the Invention

The invention relates generally to apparatus and methods for creating foamed fracturing fluids carrying high concentrations of proppant material.

2. Description of the Prior Art

During the completion of an oil or gas well, or the like, one technique which is sometimes used to stimulate production is the fracturing of the subsurface producing formation. This is accomplished by pumping a fluid at a very high pressure and rate into the formation to hydraulically create a fracture extending from the well bore out into the formation. In many instances, a proppant material such as sand is included in the fracturing fluid, and subsequently deposited in the fracture to prop the fracture so that it remains open after fracturing pressure has been released from the formation.

In recent years, it has become popular to utilize a fracturing fluid which has been foamed. There are a number of advantages of foamed fracturing fluids which are at this point generally recognized.

One advantage of foamed fracturing fluids is that they have low fluid loss characteristics resulting in more efficient fracture treatments and reduced damage to water sensitive formations.

Also, formed fracturing fluids have a relatively low hydrostatic head thus minimizing fluid entry into the formation and its resulting damage.

The foamed fracturing fluids have a high effective viscosity permitting the creation of wider vertical fractures and horizontal fractures having greater area.

Also, foamed fracturing fluids typically have a high proppant carrying capacity allowing more proppant to be delivered to the site of the fracture and more proppant to remain suspended until the fracture heals.

Currently available foamed fracturing fluids do have at least one major disadvantage, and this pertains to proppant concentrations available with currently practiced foam generation techniques. Typically, current techniques involve blending a mixture of proppant and liquid containing a suitable surfactant. The mixture is pumped to high pressure after which the gaseous phase, typically nitrogen or carbon dioxide, is added to produce the foamed sand-laden fracturing fluid.

This technique involves an inherent proppant concentration limitation due to the concentration limitation of the proppant/liquid mixture. The theoretical maximum concentration of a sand/liquid mixture is approximately thirty-four pounds of sand per gallon of liquid. This corresponds to a liquid volume just sufficient to fill the void spaces of bulk sand. In common practice, this maximum is further limited by the blending and pumping equipment capabilities and lies in a range of 15 to 25 lb/gal.

Typically, foams are produced which have approximately three unit volumes of gaseous phase per unit volume of liquid phase corresponding to a foam quality, that is a gaseous volume fraction, of 75%. Herein lies the problem; when the liquid phase is foamed, the gas expands the carrier fluid to approximately four times its original volume. A sand concentration of 25 pounds of sand per gallon of liquid in a sand/liquid slurry is reduced to approximately six pounds of sand per gallon of carrier fluid, i.e., foam, by the process of foaming. Even the theoretical maximum sand concentration of 34 lb/gal in the sand/liquid slurry would only produce an 8.5 lb/gal concentration in a 75% quality foam.

The concentration of proppant in the fracturing fluid is of considerable importance since this determines the final propped thickness of the fracture. A fracturing fluid with a sand concentration of 34 pounds of sand per gallon of carrier fluid could theoretically prop the fracture at its hydraulically created width.

Another problem encountered with many fracturing fluids including foam also involves proppant concentration and this pertains to the fracturing fluid's compatibility with the formation core and formation fluids, particularly in gas wells. For example, many formulations contain clays which swell when contacted by water base fluids resulting in reduced formation permeability. Foamed fracturing fluids reduce this problem due to their low fluid loss and low hydrostatic head characteristics, both of which result in less fluid entering the formation. However, even with foamed fracturing fluids, the theoretical maximum sand concentration is 34 pounds of sand per gallon of liquid phase of the foam and as previously mentioned, the current practical limit is about 25 pounds per gallon. A foamed fracturing fluid with a greater concentration of sand to liquid would be highly desirable for water sensitive formations since a given amount of sand could be delivered to the formation with less liquid in the carrier fluid.

Prior to the present invention, the typical approach to these problems of the inherent limitation of sand concentration in foam, created by the limitations on the proportion of sand which can be carried by the liquid prior to foaming, has been to concentrate the sand in the sand-liquid slurry prior to foaming.

One example of a foam sand concentrator of that type which also generally explains the inherent limitations in the prior art foaming processes, is shown in U.S. Pat. No. 4,448,709 to Bullen. Bullen indicates that the physical limitation of the high pressure pumps utilized in his process limits the sand concentration in the initial liquid/sand slurry to about ten pounds of sand per gallon of liquid. When such a slurry is formed to a 75% quality, the resulting foam carries 2½ pounds of sand per gallon of foam, if no concentration is used. The Bullen concentrator is stated to be capable of removing about 50% of the liquid from the slurry, thus doubling the proppant concentration in the subsequent foam to a maximum of about five pounds per gallon of 75% quality foam, that is twenty pounds per gallon of liquid in the resulting foam.

Other examples of devices which concentrate sand in the sand-liquid slurry prior to foaming are shown in U.S. Pat. No. 4,126,181 to Black and U.S. Pat. No. 4,354,552 to Zingg.

Thus it is apparent that although the prior art has recognized the problem of the inherent limitations on sand concentration in foamed proppant carrying fracturing fluids, no satisfactory solution to the problem has been provided prior to the present invention.

SUMMARY OF THE INVENTION

The present invention provides apparatus and methods by which sand concentrations many times greater than even the theoretical maximum concentration of 34 pounds sand per gallon of liquid phase can be achieved. Test have produced stable foams having sand concentrations up to 100 pounds of sand per gallon of liquid phase in the foam.

This is accomplished by introducing the sand at high pressures with the gas stream into the mixing vessel, and introducing the high pressure liquid stream separately into the vessel, thus mixing the gas, liquid and sand at high pressure in the foam generator vessel.

This avoids the inherent sand carrying limitation present when the sand is introduced in a sand/liquid slurry.

Numerous objects, features and advantages of the present invention will be readily apparent to those skilled in the art upon receiving the following disclosure when taken in conjunction with the accompanying drawings.

DETAILED DESCRIPTION OF THE PREFERRED EMBODIMENTS

Figure 1:
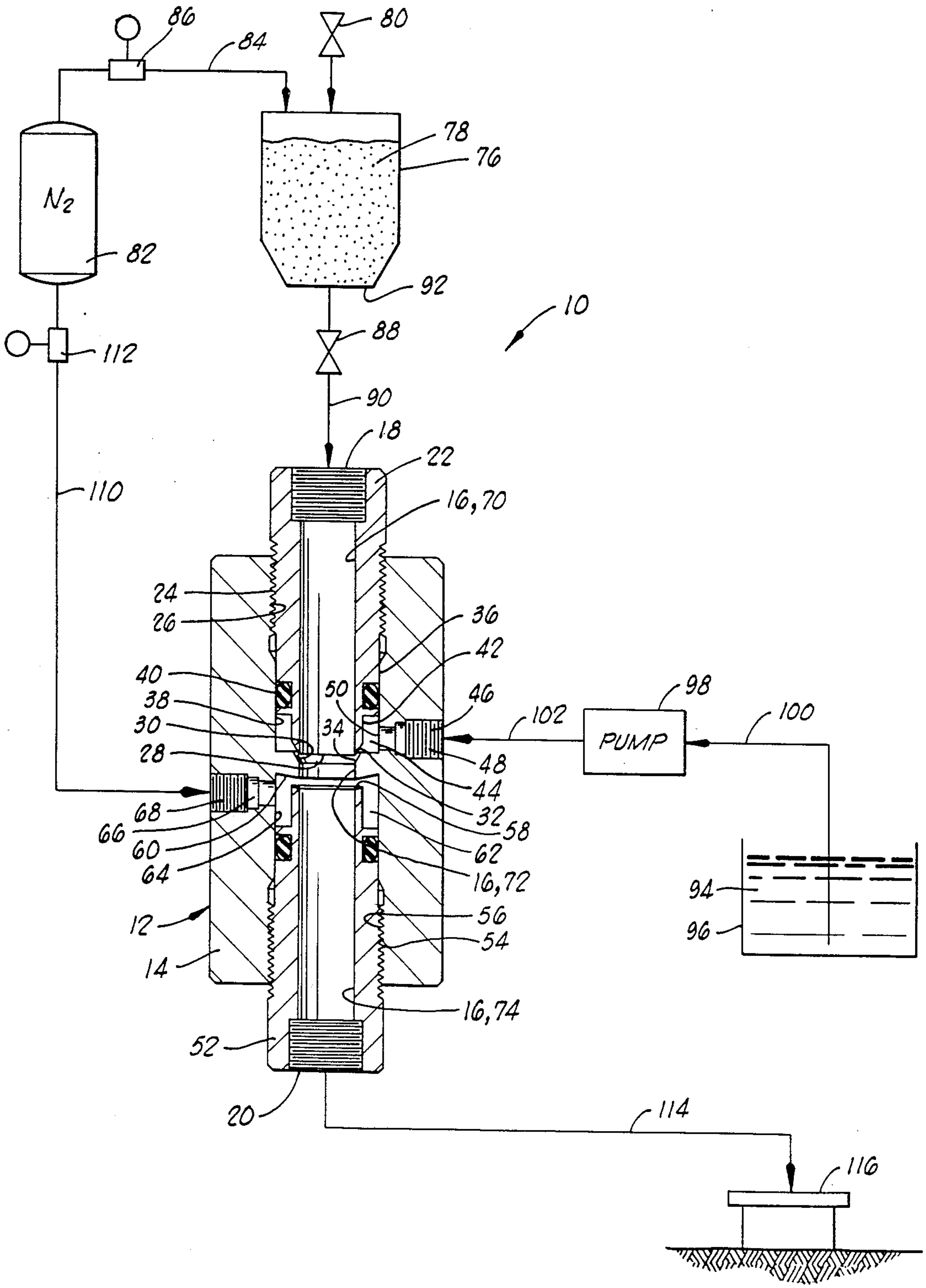
FIG. 1 shows a sectioned elevation view of a dry sand foam generator in combination with a schematic illustration of associated equipment utilized with the foam generator.

Referring now to the drawings, and particularly to FIG. 1, a system generally designated by the numeral 10 is illustrated for producing foamed fracturing fluids carrying high concentrations of proppant material in accordance with the principles of the present invention. The system 10 is based upon the use of a dry sand foam generating apparatus generally designated by the numeral 12. The foam generating apparatus 12 may also be generally referred to as a vessel 12.

Although the invention is being disclosed in the context of the production of a proppant carrying foam for hydraulic fracturing of a well, the invention is also useful in other areas such as foamed gravel packing wherein sand or the like is packed in an annulus surrounding a well casing. Further, while specific reference to a particulate material comprising sand will be discussed, it is to be understood that any other particulate may be utilized such as, for example, sintered bauxite, glass beads, calcined bauxite, and resin particles, as well as any other conventionally known particulates for use in the treatment of subterranean formations.

The foam generating apparatus 12 has a body 14 with a straight vertical main flow passage 16 disposed therethrough. Main flow passage 16 has an inlet 18 at its upper end, and an outlet 20 at its lower end.

Foam generating apparatus 12 includes an upper first nozzle insert 22 threadably engaged at 24 with an upper threaded counterbore 26 of body 14. Nozzle insert 22 has an inner end 28 received in the body 14 and adjustably positioned relative to an annular conically tapered first seat 30 surrounding main flow passage 16.

Inner end 28 of nozzle insert 22 has a conically tapered annular surface 32 defined thereon. The conical taper of surface 32 is complimentary with that of annular seat 30, that is, the taper on both the surface 32 and seat 30 are substantially the same. In the example shown, surface 32 and seat 30 are each tapered 60° from the horizontal.

An annular conical first flow path 34 is defined between tapered surface 32 and seat 30 and has a width defined vertically in FIG. 1 which is adjustable by adjustment of the threaded engagement 24 between insert 22 and body 14.

Below the threaded engagement 24, insert 22 has a reduced diameter cylindrical outer portion 36 closely received within an upper cylindrical bore 38 of body 14 with a seal being provided therebetween by O-ring 40.

Below cylindrical portion 36 is a further reduced diameter nozzle end portion 42 of insert 22.

An upper annular plenum 44 is defined between nozzle portion 42 of insert 22 and upper bore 38 of body 14, and surrounds the main flow passage 16.

A transverse liquid inlet passage 46, which may generally be referred to as a second flow passagwe 46, is disposed on the body 14. Inlet passage 46 has an outer inlet end 48, and an inner second end 50 which is communicated with the annular plenum 44.

As is further explained below, liquid inlet passage 46 is utilized to introduce a liquid stream, generally a water based liquid including surfactant, into the foam generating apparatus 12. The liquid stream also may contain other additives such as viscosifying agent, crosslinking agent, gel breakers, corrosion inhibitors, clay stabilizers, various salts such as potassium chloride and the like which are well-known conventional additives to fluids utilized in the treatment of subterranean formations.

The viscosifying agent can comprise, for example, hydratable polymers which contain in sufficient concentration and reactive position, one or more of the functional groups, such as hydroxyl or hydroxylalkyl, cis-hydroxyl, carboxyl, sulfate, sulfonate, amino or amide. Particularly suitable such polymers are polysaccharides and derivatives thereof, which include but are not limited to, guar gum and derivatives thereof, locust bean gum, tara, konjak, tamarind, starch, karaya, tragacanth, carrageenan, xanthan and cellulose derivatives. Hydratable synthetic polymers include, but are not limited to, polyacrylate, polymethacrylate, polyacrylamide, maleic anhydride-methylvinyl ether copolymer, polyvinyl alcohol and the like.

Various crosslinking agents for the above viscosifying agents are well known and include, but are not limited to, compounds containing titanium (IV) such as various organotitanium chelates, compounds containing zirconium IV such as various organozirconium chelates, various borate-containing compounds, pyroantimonates and the like.

A lower second nozzle insert 52 is threadably engaged at 54 with an internally threaded lower counterbore 56 of body 14.

Second nozzle insert 52 is constructed similar to first nozzle insert 22, except that its upper inner end has a radially inner conical tapered surface 58 which is complimentary with a downward facing conically tapered second annular seat 60 defined on body 14 and surrounding main flow passage 16. In the example shown, surface 58 and seat 60 are each tapered 15° from the horizontal.

Although the tapered annular openings associated with seats 30 and 60 are each tapered downwardly in FIG. 1, the apparatus 12 can be inverted with the seats 30 and 60 then being tapered upwardly so that the conical fluid jets ejected therefrom are directed against the downward flow of gas and sand through flow passage 16.

A lower second annular plenum 62 is defined between second nozzle insert 52 and a lower counterbore 64 of body 14.

A transverse supplemental gas inlet passage 66 is disposed in body 14 and communicates a supplemental gas inlet 68 thereof with the second plenum 62.

As is further explained below, transverse gas inlet passage 66 and the adjustable lower nozzle insert 52 are utilized to provide supplemental gas, if necessary, to the proppant carrying foam. In some instances, however, such supplemental gas may not be necessary, and the transverse gas inlet passage 66 will not be used. In fact, the methods of the present invention can in many instances be satisfactorily performed with a foam generator in which the lower second nozzle insert 52 and the associated transverse gas inlet passage 66 are eliminated.

The main flow passage 16 can generally be described as including an upper portion 70 disposed through first nozzle insert 22, a middle portion 72 defined within the body 14 itself, and a lower portion 74 defined in second nozzle insert 52.

Also schematically illustrated in FIG. 1 are a plurality of associated apparatus which are utilized with the foam generating apparatus 12 to produce a proppant laden foamed fracturing fluid.

A high pressure sand tank 76 is located vertically directly above the foam generating apparatus 12. Sand tank 76 is substantially filled with a particulate material such as sand 78 through a sand fill inlet valve 80.

The sand tank 76 is then filled with high pressure nitrogen gas from a nitrogen gas supply 82 through primary nitrogen supply line 84. A pressure regulator 86 and other conventional equipment (not shown) for controlling the pressure of the gas supplied to sand tank 76 are included in supply line 84. While the gas supply 82 is disclosed as nitrogen, many other gases are suitable for use in generating a foam according to the methods and using the apparatus of the present invention. Such other gases include, without limitation, air, carbon dioxide, as well as any inert gas, such as any of the noble gases.

After the sand tank 76 is filled with sand 78, it is pressurized with nitrogen gas to a relatively high pressure, preferably above 500 psi for reasons that are further explained below.

This dry sand 78 is introduced into the foam generating apparatus 12 by opening a valve 88 in sand supply line 90 which extends from a bottom 92 of sand tank 76 to inlet 18 of main flow passage 16 of foam generating apparatus 12. The sand supply line 90 preferably is a straight vertical conduit, and the valve 88 is preferably a full opening type valve such as a full opening ball valve.

When the valve 88 is opened, a stream of gas and sand is introduced into the main flow passage 16 of apparatus 12. The dry sand 78 flows by the action of gravity and differential gas pressure downward through a feeder 92 and into sand supply line 90 into the vertical bore 16 of foam generating apparatus 12.

A water based liquid 94 is contained in a liquid supply tank 96. A high pressure pump 98 takes the liquid 94 from supply tank 96 through a suction line 100 and discharges it under high pressure through a high pressure liquid discharge line 102 to the inlet 48 of transverse liquid inlet passage 46.

The liquid 94 in supply tank 94 will have a sufficient concentration of a suitable surfactant mixed therewith in tank 96, so that upon mixing the liquid 94 with gas and sand in flow passage 16, a stable foam will be formed. Suitable surfactants are well known in the art and include, by way of example and not limitation, betaines, sulfated or sulfonated alkoxylates, alkyl quaternary amines, alkoxylated linear alcohols, alkyl sulfonates, alkyl aryl sulfonates, $C_{10}$–$C_{20}$ alkyldiphenyl ether sulfonates and the like.

The liquid and surfactant flow through the transverse liquid inlet passage 46 into the annular plenum 44. The liquid and surfactant then flow from the annular plenum 44 in the form of a self-impinging conical jet flowing substantially symmetrically through the first annular flow passage 34 and impinging upon the vertically downward flowing stream of gas and sand flowing through main flow passage 16.

This high pressure, high speed, self-impinging conical jet of water base liquid and surfactant mixes with the downward flowing stream of gas and dry sand in a highly turbulent manner so as to produce a foam comprised of a liquid matrix of bubbles filled with nitrogen gas. This foam carries the sand in suspension therein.

If supplemental gas, in addition to the gas introduced with the dry sand from said tank 76, is required to achieve the desired foam quality, that gas is supplied from nitrogen gas supply 82 through a supplemental gas supply line 110 having a second pressure regulator 112 disposed therein. Supplemental gas supply line 110 connects to supplemental gas inlet 68 of transverse gas inlet passage 66 so that gas is introduced into the second annular plenum 62 and then through the conical flow passage defined between conically tapered surface 58 on the inner end of lower nozzle insert 52 and the tapered annular lower seat 60 of body 14.

In the testing of the foam generating apparatus 12 which has been done to date, however, it has been determined that in many instances sufficient gas can be introduced with the dry sand 78 from the sand tank 76, and that the desired foam quality can be controlled by controlling the amount of liquid introduced through transverse liquid inlet passage 46.

The proppant laden foam generated in the foam generating apparatus 12 exits the outlet 20 and is conducted through a conduit 114 to a well 116. As will be understood by those skilled in the art, the foam fracturing fluid is directed downwardly through tubing (not shown) in the wall 116 to a subsurface formation (not shown) which is to be fractured.

When conducting a hydraulic fracturing operation, the pressure of the fracturing fluids contained in conduit 114 when introduced into the well head 116 are substantially in excess of atmospheric pressure. Well head pressures in a range from 1000 pi to 10,000 psi are common for hydraulic fracturing operations.

The delivery rate of dry sand 78 into the foam generator 12 is controlled by the differential gas pressure between the sand tank 76 and the bore 16 of the foam generator apparatus 12. For a given sand delivery rate, flow rate of the liquid jet entering transverse liquid inlet passage 46 determines the liquid sand concentration, that is the pounds of sand per gallon of liquid phase in the carrier fluid, of the generated foam. The volume rate of gas through sand supply line 90 required to deliver the dry sand together with the volume rate of supplemental gas, if any, supplied through transverse gas inlet passage 66 determine the quality, that is the gaseous volume fraction of fluid phases, of the generated foam.

If it is desired to vary the flow rate of dry sand 78 into the foam generating apparatus 12, that will generally be accomplished by varying the nitrogen pressure supplied to the sand tank 76.

If it is desired to vary the flow of liquid to the transverse liquid inlet passage 46 of foam generator 12, that will be accomplished by varying the pumping rate of pump 98.

The setting of the threaded engagement of upper nozzle insert 22 with body 14 permits adjustment of the width of the first annular flow path 34. This adjustment is generally utilized for the purpose of achieving an appropriate mixing energy and thus a satisfactory foaming of the materials which are mixing within the main flow passage 16. This adjustment also conceivably could be used to affect the flow rate of liquid therethrough.

Although not shown in FIG. 1, suitable flowmeters may be placed in lines 84, 102 and 110 to measure the flow of fluids therethrough. Flow of sand out of tank 76 can be measured by measuring a change in weight of the tank 76 and its contents.

It is noted that the high pressure nitrogen supply illustrated in FIG. 1, namely the cylinder 82 of compressed nitrogen gas and the pressure regulator 86, are representative of the equipment utilized for the laboratory tests described below. In actual field usage, however, nitrogen will typically be supplied by a positive displacement cryogenic pump which pumps nitrogen in a supercooled liquid state into the supply lines 84 and/or 110. In such a system, the mass flow rate of nitrogen will be known and controlled by the volumetric rate of the cryogenic pump.

Figure 2:
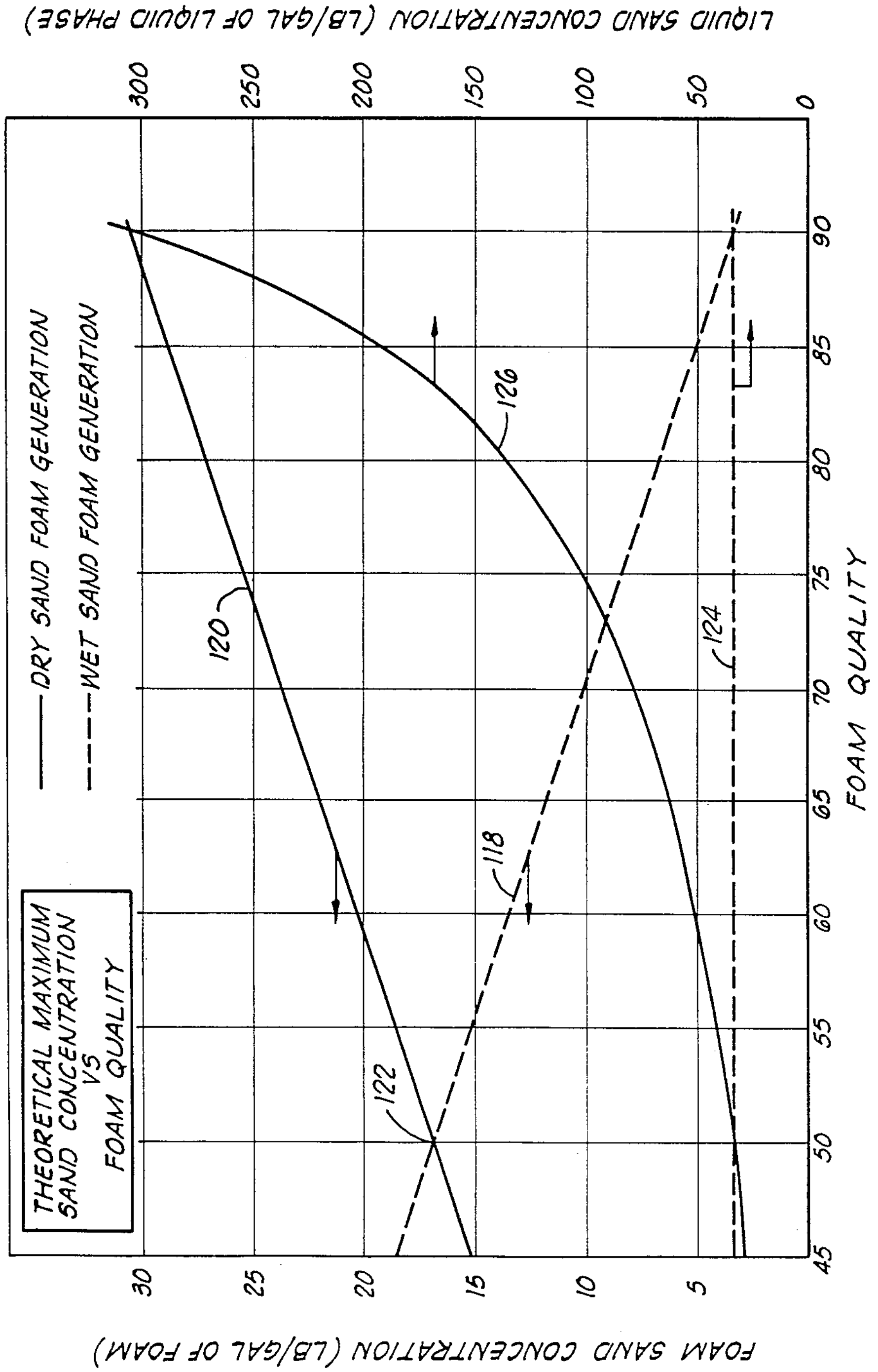
FIG. 2 is a graphical illustration of the theoretical maximum sand concentrations of both the prior art wet sand foam generation techniques and the new dry sand foam generation techniques of the present invention, as a function of foam quality. On the left-hand vertical axis of FIG. 2, the foam sand concentrations are displayed in pounds of sand per gallon of foam. On the right-hand vertical axis of FIG. 2, the liquid sand concentrations are displayed as pounds of sand per gallon of liquid phase contained in the foam.

Referring now to FIG. 2, a graphical representation is presented of the theoretical maximum sand concentration of a foam as a function of foam quality, both for wet sand foam generation such as has been practiced in the prior art where the sand is introduced in a sand/liquid slurry, and for dry sand foam generation as disclosed in the present application wherein the sand is introduced with a stream of gas. There are two sets of data displayed in FIG. 2. Foam sand concentration, that is, the pounds of sand per gallon of foam, is displayed vertically on the left side of the graph. The values displayed on the right-hand vertical axis of FIG. 2 are for liquid sand concentrations, that is, the pounds of sand per gallon of liquid phase of the foam.

Looking first at the foam sand concentrations displayed on the left-hand vertical axis of FIG. 2, the theoretical maximum foam sand concentration for a wet sand foam generation process like that utilized in the prior art is shown by the dashed line 118 and is seen to be a decreasing linear function of foam quality. The plotted maximum concentrations for the wet sand foam generation process as represented by line 118 are obtained by adding sufficient gas volume to the liquid occupying the void volume of bulk sand to obtain a given foam quality.

The theoretical maximum foam sand concentration for the dry sand foam generation process of the present invention is represented by the solid line 120 and is seen to be an increasing linear function of foam quality. The plotted maximum concentrations for the dry sand foam generation process as represented by straight line 120 are obtained by adding sufficient liquid to the gas volume occupying the void volume of bulk sand to obtain a given foam quality.

It is noted that the lines 118 and 120 intersect at a point 122 corresponding to a 50% foam quality. At a 50% foam quality, both the wet sand foam generation process represented by line 118 and the dry sand foam generation process represented by line 120 provide an identical foam since they both contain equal volumes of gas and liquid and an identical amount of sand.

It is further noted that for foam qualities less than 50%, the theoretical maximum foam sand concentrations for the dry sand process of the present invention are lower than those for the wet sand foam generation process of the prior art, and thus it may be undesirable to use the dry sand foam generation process when a relatively low quality foam below 50% is desired. It must be remembered, however, that the values shown in FIG. 2 are theoretical maximums, which differ substantially from the practical maximums which can be obtained in some cases, and thus in some situations there may still be an advantage to using the dry sand foam generation process of the present invention for relatively low quality foams below 50% quality.

It is generally desired that the foam produced by the present invention have a "Mitchell quality", that is, a volume ratio of the gaseous phase to the total gaseous and liquid phases and disregarding the volume of the particulate solids, in the range from about 0.53 to 0.99. This can also be expressed as a quality in the range from about 53% to about 99%. A general discussion of the Mitchell quality concept can be found in U.S. Pat. Nos. 4,480,696 to Almond et al. 4,448,709 to Bullen, and 3,937,283 to Blauer et al.

For the purposes of the present invention, it is preferred that an upper limit of foam quality be about 96%, because the properties of the foam become somewhat unpredictable at higher quality levels where the foam may convert to a mist. Thus, the generally preferred range of quality for foams generated by the dry sand foam generation process of the present invention is in a range from about 53% to about 96%.

Referring now to the liquid sand concentrations displayed on the right-hand vertical axis of FIG. 2, the theoretical maximum liquid sand concentrations for the prior art wet sand foam generation process and for the dry sand foam generation process of the present invention are shown by dashed line 124 and solid line 126, respectively.

For the prior art wet sand foam generation processes, line 124 shows a constant 34 lb/gal theoretical maximum liquid sand concentration. As previously explained, this is determined by the volume of liquid required to fill the void spaces in tightly packed sand.

However, for the dry sand foam generation process of the present invention as represented by solid line 126, the maximum liquid sand concentration is unbounded as the foam quality approaches 100%.

As is apparent from the graphical comparisons shown in FIG. 2, the potential for achieving high sand concentrations in a proppant carrying foam utilizing the dry sand foam generation techniques of the present invention is many times greater than that using prior art wet sand foam generation techniques.

Figure 3:
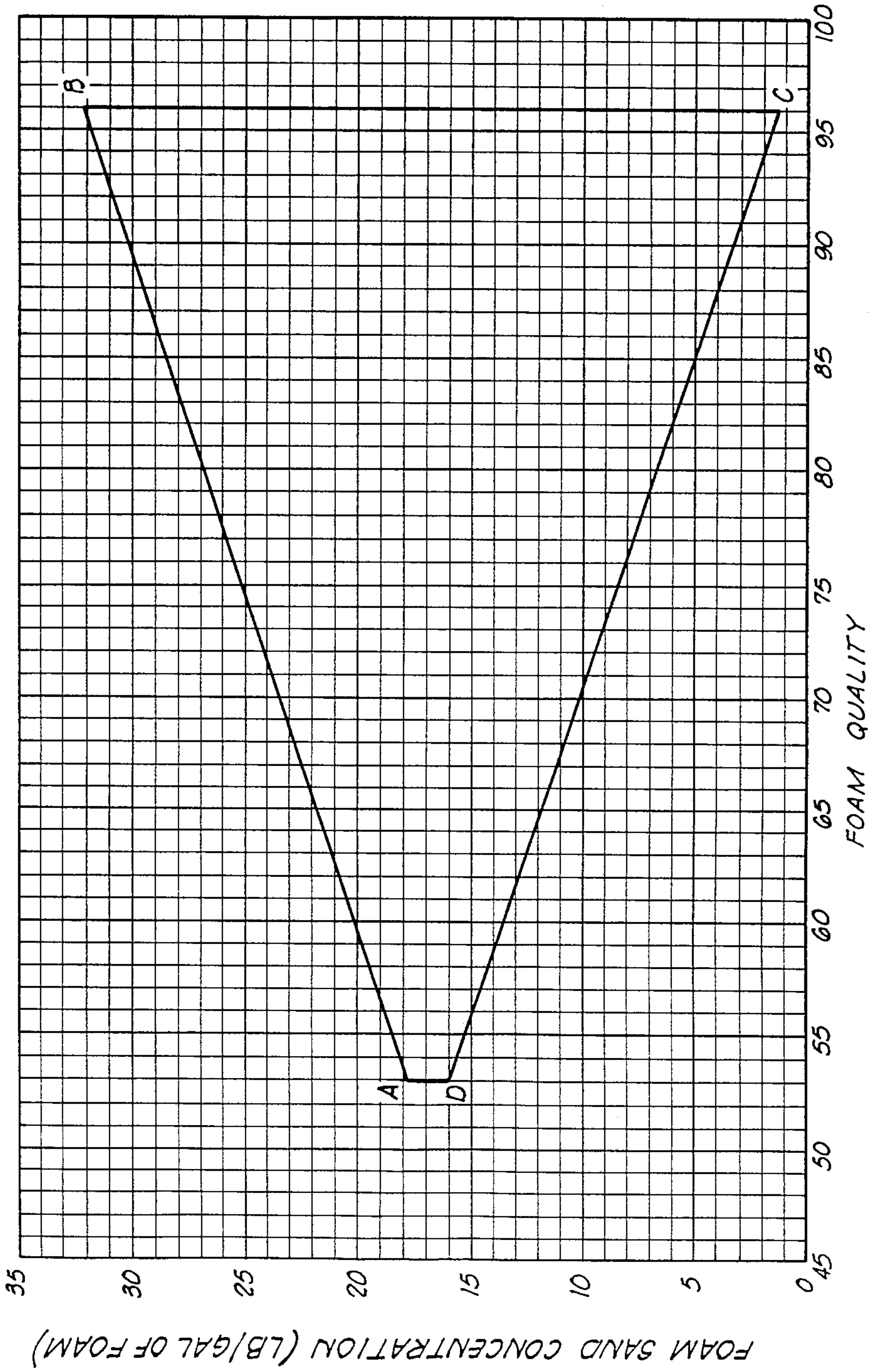
FIG. 3 is a graphical illustration of the composition of foams created by the apparatus and methods of the present invention as a function of foam quality and particulate concentration.

With the methods of the present invention, proppant carrying foamed fracturing fluids can be produced which contain a ratio of sand to the liquid phase of the foam, that is, a lquid sand concentration such as that represented on the right-hand vertical axis of FIG. 2, substantially in excess of both the theoretical maximum ratio of particulate material to liquid which could have been contained in the liquid, i.e., 34 lbs/gal, and the somewhat lower practical maximum ratio, i.e., 15 to 25 lbs/gal, which could have been contained in the liquid as a result of limitations on pumping equipment and the like. In this regard, referring now to FIG. 3, the preferred compositions of foams produced by the present invention include those compositions denoted by the trapezoidal region defined by the points A, B, C and D.

A number of laboratory tests, which are described below, have been performed with the dry sand foam generation process of the present invention, and it has been determined that with the apparatus illustrated in FIG. 1, it is desirable that the process be performed with a nitrogen gas pressure within the sand tank 76 at least equal to about 500 psi. At such supply pressures, the pressure drop between tank 76 and bore 16 of foam generating apparatus 12 is only about 15 psi, so that the pressure at which the foam is generated in bore 16 is also equal to at least about 500 psi.

Tests have been conducted utilizing a gas pressure in sand tank 76 ranging from about 50 psi up to about 1,000 psi. At nitrogen pressures in sand tank 76 lower than about 500 psi, it has been observed that there is an excess of gas present in the foam generating apparatus 12, and a continuous uniform foam is not produced; instead, the fluid exiting outlet 20 has intermittent slugs of gas contained in the foam.

With nitrogen gas pressures in sand tank 76 in excess of about 500 psi, a continuous substantially uniform foamed fluid is produced.

The tests to date have all been run with water based fluids, varying from plain water up to a viscosified fluid containing forty pounds of derivatized guar per 1,000 gallons of water, all with satisfactory results.

All tests to date have been run utilizing a surfactant sold under the trade name "Howco Suds", a water-soluble biodegradable surfactant blend, which can be obtained from Halliburton Services, Duncan, Okla.

EXAMPLE NO. 1

An early test was conducted utilizing a pressurized air source at 82 rather than pressurized nitrogen. The sand tank 76 was pressurized to approximately 75 psi with compressed air. The differential pressure between the sand tank 76 and the main flow passage 16 of the foam generating apparatus 12 was about 50 psi. The test was run until a five-gallon bucket was filled with foam exiting outlet 20. The weight of sand delivered from sand tank 76, and water delivered from supply tank 96 were determined, and converted on a volume basis. In that manner it was determined that the five gallons of foam collected included 1.32 gallons of sand and 0.37 gallons of water. The remaining volume of the five gallons of foam, i.e., 3.31 gallons, was comprised of air. From this data, a foam quality of 89.9% was calculated. The liquid sand concentration was calculated to be 74.9 pounds of sand per gallon of water in the foam, which corresponds to 7.53 pounds of sand per gallon of foam. In this test, the liquid was actually introduced through passage 66 rather than passage 46, so that the liquid entered flow passage 16 as a concentric conical jet tapered downwardly at an angle of 15° to the horizontal. The foam generating apparatus 12 utilized in this test had a bore 16 with a diameter of 3/8 inch.

EXAMPLE NO. 2

A later test was run, again using a foam generator with a 3/8-inch bore. In this example, the liquid stream was injected into passage 46 so that it entered the main flow passage 16 at a downward angle of 60° to the horizontal. Air pressure supplied to the top of tank 76 was at 69 psi. Air pressure measured in line 90 immediately above the apparatus 12 was 50 psi. A liquid flow rate through line 102 of 0.34 gallons per minute at a pressure of 175 psi was measured. A total weight of sand injected was measured to be 41.64 pounds. Again, the test was run until a five-gallon can of foam was produced. The sand volume in the foam was calculated to be 1.89 gallons. The liquid volume in the foam was calculated to be 0.42 gallons. This left an air volume in the foam of 2.69 gallons. From this a quality of 86.5% was determined. A liquid sand concentration of 99.9 pounds of sand per gallon of liquid phase of the foam was calculated. This foam was observed to be a good stable foam.

In both of Examples Nos. 1 and 2 described above, it was observed that there were substantial excess air present in the process, as slugs of air were intermittently produced from outlet 20 between slugs of foam.

Substantial further testing was conducted and modifications made to attempt to eliminate this excess air. Testing was done utilizing centrifugal separators to separate the foam from the excess air.

Finally, later testing showed that the problem of excess air was eliminated when the pressure of gas supplied to sand tank 76 exceeded about 500 psi. This is shown in the following Example No. 3.

EXAMPLE NO. 3

This test was run using a foam generator with a 3/8-inch bore. The liquid stream was injected into passage 46 so that it entered the main flow passage 16 at a downward angle of 60° to the horizontal. The test apparatus was modified to allow the generated foam to be collected in a receiver vessel (not shown) at approximately the same pressure at which it was generated. The volume of generated foam was determined by measuring a volume of water displayed from the receiver vessel. An average nitrogen pressure in sand tank 76 was 756 psig. Average pressure in the bore 16 of foam generating apparatus 12 was 750 psig. Average pressure in the foam receiver vessel was 730 psig. The test was run for 5.0 minutes. Total sand weight delivered was 292 lb. for a sand rate of 58.4 lb/min. Total liquid supplied was 3.0 gal. for a liquid rate of 0.60 GPM. The gas flow rate of the apparatus 12 was calculated to be 55.7standard cubic feet per minute. Total foam generated was 57.37 gal. From this data a foam quality at the foam generator 12 of 93% was calculated. A liquid sand concentration of 97.3 pounds of sand per gallon of liquid phase of the foam was calculated. This corresponds to a foam sand concentration of 6.8 pounds of sand per gallon of foam. A volumetric rate of foam production at the generator was 11.26 GPM.

Finally, it has been determined subsequent to the testing described above, that at high gas supply pressures, e.g., 900 psi, it is not necessary to direct the liquid phase into the foam generator as a self-impinging conical jet; instead a simple "tee" can be used to mix the liquid with the gas and dry sand.

Thus it is seen that the apparatus and methods of the present invention readily achieve the ends and advantages mentioned as well as those inherent therein. While certain preferred embodiments of the invention have been illustrated for the purposes of the present disclosure, numerous changes in the arrangement and construction of parts and steps may be made by those skilled in the art, which changes are encompassed within the scope and spirit of the present invention as defined by the appended claims.

What is claimed is:

1. A method of generating a foam containing particulate material for treating a subsurface earth formation penetrated by a well bore, said method comprising:
   (a) introducing a first stream of pressurized gas having dry particulate material entrained therein into a vessel, said particulate material flowing vertically downward into said vessel, at least in part due to the action of gravity;
   (b) introducing a second stream of liquid into said vessel;
   (c) varying said second stream into a self-impinging conical jet;
   (d) impringing said conical jet onto said first stream and thereby forming a foam containing particulate material; and
   (e) injecting such a foam into the well bore.

2. The method of claim 1, wherein:
   said foam has a quality of substantially greater than approximately 75%.

3. The method of claim 1, wherein:
   step (a) is further characterized in that said first stream is introduced into a cylindrical bore of said vessel;
   step (b) is further characterized in that said second stream is introduced into an inlet passage in communication with an annular plenum surrounding said bore and communicated with said bore by an annular opening;
   step (c) is further characterized in that said second stream is varied into said conical jet within said annular plenum; and
   step (d) is further characterized in that said conical jet flows radially inward through said annular opening to impinge upon said first stream.

4. The method of claim 3, further comprising a step of:
   adjusting a width of said annular opening.

5. The method of claim 1, wherein:
   step (a) is further characterized in that said first stream is introduced into a substantially linear flow passage of said vessel; and
   steps (c) and (d) are further characterized in that said self-impinging conical jet discharges substantially symmetrically into said flow passage while impinging upon said first stream.

6. The method of claim 5, wherein:
   step (a) is further characterized in that said flow passage is oriented substantially vertically.

7. The method of claim 1, further comprising a step of:
   introducing a third stream of gas into said vessel, and adding said third stream to said foam.

8. The method of claim 1, wherein:
   step d is further characterized in that said foam has a quality in a range from about 53% to about 96%.

9. The method of claim 1, wherein:
   steps (a), (b), (c) and (d) are all performed at relatively high pressures substantially in excess of atmospheric pressure.

10. The method of claim 9, wherein:
   steps (a), (b), (c) and (d) are all performed at pressures at least equal to about 500 psi.

11. The method of claim 1, wherein:
   step (a) is further characterized in that said gas is nitrogen gas and said particulate material is sand; and
   step (b) is further characterized in that said liquid is an aqueous based liquid including a surfactant.

12. The method of claim 1 wherein said method further comprises the steps of varying the flow rate of said second stream of liquid into said vessel while maintaining a substantially constant gas flow rate thereby varying the concentration of particulate material per unit volume of liquid.

* * * * *

UNITED STATES PATENT AND TRADEMARK OFFICE
CERTIFICATE OF CORRECTION

PATENT NO. : 4,780,243

DATED : October 25, 1988

INVENTOR(S) : Kevin D. Edgley et al.

It is certified that error appears in the above-identified patent and that said Letters Patent is hereby corrected as shown below:

Column 11, line 25, claim 1, delete "impringing" and insert --impinging--.

Signed and Sealed this

Thirtieth Day of May, 1989

*Attest:*

DONALD J. QUIGG

*Attesting Officer*

*Commissioner of Patents and Trademarks*